United States Patent [19]
Hardway, Jr.

[11] 3,760,254
[45] Sept. 18, 1973

[54] THREE-TERMINAL CAPACITIVE SERVOMECHANISM

[75] Inventor: Edward V. Hardway, Jr., Houston, Tex.

[73] Assignee: Spearhead, Inc., Houston, Tex.

[22] Filed: Mar. 6, 1972

[21] Appl. No.: 232,153

[52] U.S. Cl. ............... 318/662, 323/75 P, 323/93, 317/253
[51] Int. Cl. ............................................. G05b 1/06
[58] Field of Search ................... 318/662; 323/75 P, 323/93; 317/253

[56] References Cited
UNITED STATES PATENTS

| | | | |
|---|---|---|---|
| 3,657,630 | 4/1972 | Fiet | 318/662 X |
| 3,253,207 | 5/1966 | Jauch | 317/253 X |
| 3,307,398 | 3/1967 | Exon | 323/75 P |
| 3,683,402 | 8/1972 | Parnal | 318/662 X |

Primary Examiner—T. E. Lynch
Attorney—W. F. Hyer et al.

[57] ABSTRACT

Three-terminal capacitive servomechanisms are disclosed using single and differential three-terminal capacitors, as the transmitting and receiving elements thereof. Each of the transmitter and receiver capacitors includes a conductive driven element connected to a source of electrical drive signals, a conductive receptor element connected to a high gain amplifier, and shielding circuits connected to ground. The amplifier includes a capacitive feedback loop and clamps the receptor elements to virtual ground. The feed-through capacitances of the transmitter and receiver capacitors are unaffected by stray and cable capacitance thus permitting remote sensing, and the effect of conductance in these capacitors can be cancelled out by use of a synchronous demodulator connected to the output of the amplifier.

25 Claims, 13 Drawing Figures

Patented Sept. 18, 1973

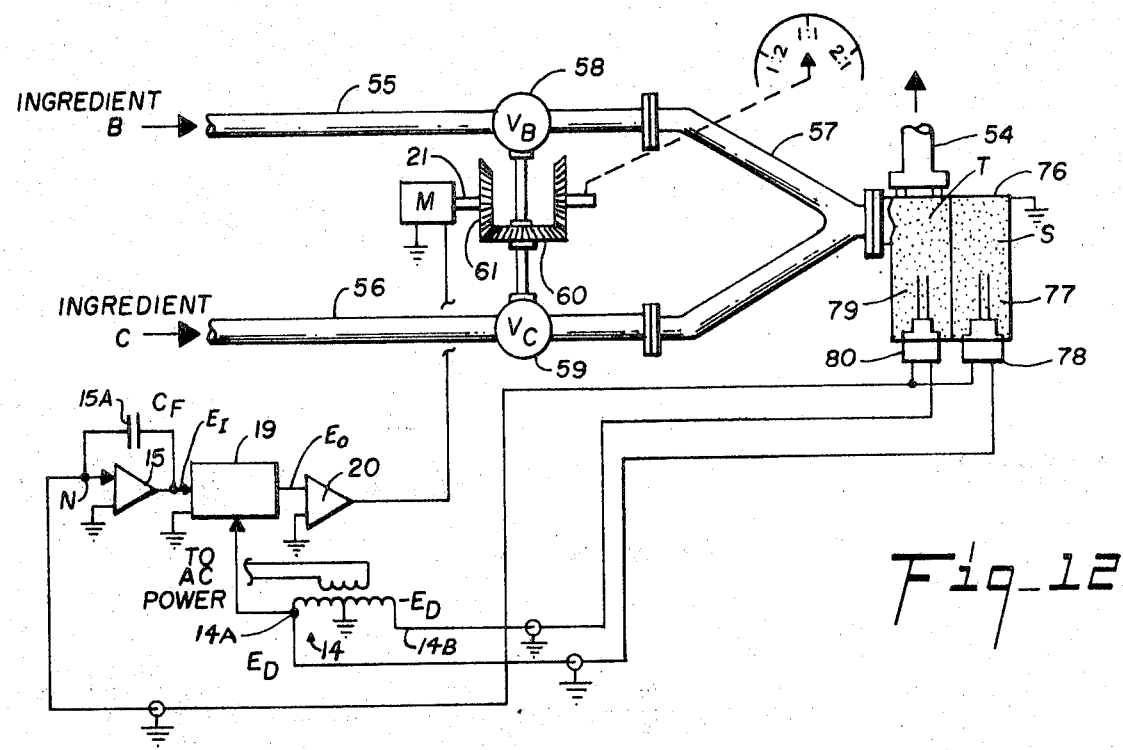
Fig_12

THREE-TERMINAL CAPACITIVE SERVOMECHANISM

This invention relates to servomechanisms and in one of its aspects to such servomechanisms which employ three-terminal capacitors as transmitting and receiving elements. Another aspect of this invention relates to use of these capacitors as angle transducers, dielectric cells or probes for many different and varied industrial applications of the servomechanism.

Servomechanisms are used in many applications to provide a control function in response to a condition or a change in a condition. Examples are the control of a navigational guidance system in response to small angular changes and control of a level in a container in response to a change in set point or desired level. In a conventional positional servomechanism, an angle transducer or position sensor may be employed as an input or transmitter element which transmits information giving the desired angle or position. The transmitter is connected in a balanced or null circuit with a receiver or output element which is coupled to the output member or condition being controlled. The transmitting and receiving elements are often identical. When they are out of balance with respect to each other an error signal is provided which is amplified and drives a servomotor which in turn drives the controlled condition member (such as a rudder or valve) until a balance between the transmitting and receiving elements is obtained and the error signal is zero.

Potentiometers, synchros and linear variable differential transformers or "LVDT's" are commonly used in such servomechanisms as the transmitting and receiving elements, but these devices have important application limitations. Potentiometers and synchros have wipers or slip-rings which wear out and cause excessive noise and LVDT's have relatively high inertia. Also, none of these devices are suitable for use at elevated temperatures. Variable capacitors or capacitive transducers, on the other hand, can be constructed so that their rotors have very low inertia and the use of slip-rings or wiper contacts can be avoided. Capacitors also can be constructed of metals and ceramics that will withstand very high temperatures indefinitely.

In spite of these advantages, the use of variable capacitors as transmitting or feedback elements in servo mechanisms has been limited by a number of factors. Among these are nonlinearities caused by fringing, stray capacitance effects, the need for high input impedance circuitry, and the effective inclusion of any connecting cable capacitance in parallel with the transmitting and receiving capacitors. Prior servo level indicators, for example, employ four arm capacity bridge circuits where the capacitance of the transmitting element or probe is measured in parallel with the capacitance of the cable, thus making the indication responsive to changes in cable type, length, and changes with temperature. Also, prior positional servomechanisms employing capacitive transmitters use two-terminal capacitors with one side grounded and because of this are not suitable for many remote sensing applications.

It is thus an object of this invention to provide a relatively precise, low cost, servomechanism employing three-terminal capacitive transmitting and receiving elements, and wherein the associated electronic circuits may be located remotely from the transmitting or receiving capacitor without materially affecting the accuracy or response of the servomechanism.

Another object of this invention is to provide such a servomechanism in which remote sensing applications can be provided for without precisely controlling the type, length, and capacitance of the connecting cables used.

Another object of this invention is to provide a positional servomechanism in which fringing errors and small errors in configuration of the capacitive elements can be effectively cancelled.

Another object of this invention is to provide a servomechanism in accordance with one or all of the above objects which can perform analog computations.

Another object of this invention is to provide a servomechanism in accordance with one or more of the above objects which is responsive to change of level of material in a tank or container, and which can be used in controlling the level of the material being measured.

Another object of this invention is to provide a servomechanism in accordance with one or more of the above objects which is responsive to a change of moisture content or ingredients ratio of a material, and which can be used to control the moisture content or ingredients ratio of the material.

Another object of this invention is to provide a servomechanism in accordance with one or more of the above objects which may be used to determine when there is a difference in moisture content or ingredients ratio between a desired product and a measured product, and which may be used to control the amount of moisture or the ingredients ratio of the measured product.

These and other objects of this invention, which will become apparent upon consideration of the descriptions herein and appended claims and drawings, are accomplished according to this invention by providing a servomechanism in which both the transmitting element (or elements) and the receiving element thereof are three-terminal capacitors utilizing one or more driven elements and one or more receptor elements. A shield or guard potential which is at earth ground or the potential of the surrounding structure, such as an aircraft, is provided. The transmitting and receiving capacitors may be single or differential capacitors and may be used to control or monitor an angle, position or a condition of a material such as dielectric constant. They also may be variable angle or position transducers with an element such as a rotatable grounded shield between the driven and receptor elements which moves in response to a change in an angle or position being controlled or monitored, or capacitive cells or probes which vary in feed-through capacitance in response to a condition of a material being monitored or controlled. In each case, the driven elements of the transmitting and receiving capacitors are connected to a low impedance source or sources of drive signals and the receptor elements thereof are connected to the input of one or more high gain amplifiers which have capacitive feedback loops for maintaining the receptor elements clamped at a very low signal level, or virtual ground, with respect to the signal levels of the drive signals. The input of the feedback amplifier (or amplifiers) functions as a null junction which is at zero signal level when the servo is in balance. The active capacitance of such variable three-terminal capacitors is the feed-through capacitance between the driven and receptor elements, and these are compared at the null junction. Because of the input and output electronics used, the capacitances between the receptor elements and ground or the driven elements and ground have negligible effect, as does the capacitances of connecting cables used between the three-terminal capacitors and their associated electronics. Thus, the servomechanism is particularly suited for remote sensing or control applications.

The transmitting capacitor, for example, may be a variable air capacitor responsive to a shaft position or a linear displacement, or it may be a level probe in a tank or a dielectric constant cell or probe used for determining moisture content, ingredient ratio, or a change in capacitance. For some applications, more than one transmitting capacitor may be paralleled or connected so that their output signals add, and they may be linear or nonlinear. The receiver capacitor, on the other hand, is used alone and should be linear in operation, so that its capacitance varies in a near linear fashion with the output of the servomechanism, which is, most often, a shaft position connected to an indicator, recorder pen, or some form of controller. In some instances, differential transmitters and receivers are used to operate over small angles or respond to small changes in capacitance or dielectric constant.

In one embodiment disclosed, identical variable air capacitors are used for both the transmitter and receiver capacitors so that all fringing errors and plate shape errors cancel. Thus, these capacitors may be inexpensively constructed as long as they are made just alike, the latter being an inherent result of complete tooling in manufacture.

In these instances where leakage conductance, or conductance in a material being measured, detrimentally affects the operation of the servomechanism, a synchronous demodulator or a two phase servo motor may be utilized to substantially cancel the effects of conductance. Also, since the electronics may be remotely located from the transmitting or receiving capacitors, the latter may be designed to withstand relatively high temperatures. Also, where properties of two or more materials are being compared, this can be done in a differential capacitive cell which provides for a temperature equilibrium between the materials.

The three-terminal capacitive servomechanism techniques disclosed herein may be utilized to construct three-terminal capacitors as angle or position sensors, level or dielectric probes or differential cells for many different industrial or scientific applications.

In the drawings, wherein are illustrated preferred embodiments of this invention and like reference numerals are used to designate like parts throughout;

FIG. 12 shows a capacitive servomechanism of this invention for controlling the ratio of two ingredients being mixed in an on-stream process.

Figure 1:
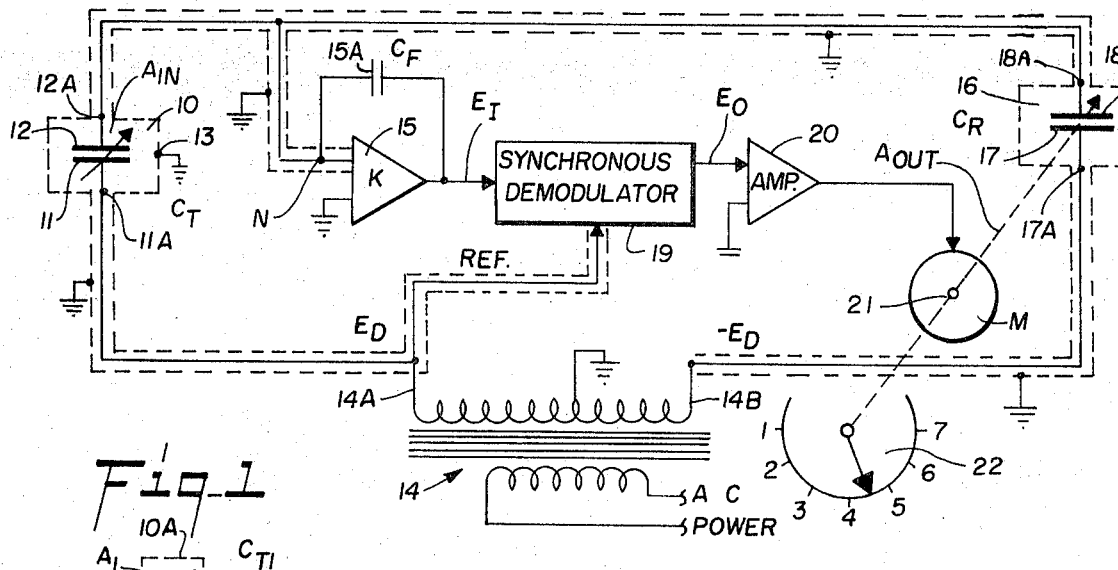
FIG. 1 is a schematic diagram of one form of capacitive servomechanism of this invention employing one transmitter and one receiver, which may be capacitive angle transducers.

Referring now to FIG. 1, the preferred form of servomechanism of this invention illustrated includes a three-terminal variable transmitting capacitor 10, such as an angle transducer, with feed-through capacitance $C_T$, including a conductive driven element 11 and a conductive receptor element 12. Driven element 11 is connected to a high signal level terminal 11A, receptor element 12 is connected to a low signal level terminal 12A, and the third terminal of three-terminal transmitting capacitor 10 is a terminal 13 connected to ground, to internal shielding of the capacitor and to the shields of connecting cables. If position or relatively large angular displacements (for example, 0–160°) are being sensed, then suitable transducers for capacitor 10 may be those illustrated in the copending patent application of James A. Parnell, entitled "Capacitive Transducer," Ser. No. 89,154, filed Nov. 13, 1970, now U.S. Pat. No. 3,668,672.

Terminal 11A is connected to the secondary of a transformer 14 to provide a low impedance source 14A of electrical drive signals having a predetermined alternating current (AC) voltage level $E_D$, and terminal 12A is connected to an input N of a high gain amplifier 15, which has a gain of K and includes a capacitor 15A, with capacitance $C_F$ connected between its output and input N to form a feedback loop. The output signals from amplifier 15, are termed $E_I$, and by virtue of the feedback loop, input N, terminal 12A and receptor element 12 are clamped to very low signal level with respect to the signal level $E_D$, which low signal level is herein defined as virtual ground. Thus input N provides a low impedance output connection for capacitor 10 and insures that the effect of stray and cable capacitances will have minimal effect on the feed through capacitance $C_T$. By providing relatively low impedance signal input and output connectors for capacitor 10 it may be remotely located from amplifier 15 and source 14 by relatively long connecting cables and the capacitances of these cables will not detrimentally affect the operation of the servomechanism.

The servomechanism illustrated in FIG. 1 also includes a three-terminal variable receiving capacitor 16 with feed-through capacitor $C_R$, which has a driven conductive element 17 and high signal level terminal 17A connected to the secondary of transformer 14 to provide a low impedance source 14B which in this case supplies an electrical drive signal having an AC voltage level $-E_D$ 180° out of phase with signal $E_D$, but of the same amplitude. Receiver element 16 also includes a receptor conductive element 18 and a low signal level terminal 18A which is also connected to input N of amplifier 15 and is also clamped to virtual ground by this amplifier. Receiver 16 may also be the type of position or angle transducers noted with respect to transmitter 10.

The output of amplifier 15 (providing signal $E_I$) is connected to a synchronous demodulator 19 which is also connected to source 14A and switched internally by drive voltage $E_D$ to provide a DC output signal $E_O$ proportional to signal $E_I$. Synchronous demodulator 19 effectively cancels quadrature voltages that would appear on signal $E_O$ as the result of leakage or shunt conductance of capacitors 10 and 16. The DC output of demodulator 19 is fed to a DC servo amplifier 20 which supplies power to drive a DC servo motor M having an output shaft 21. Motor M is also connected by shaft 21 to the movable element of receiving capacitor 16 (which may be a moving grounded shield between the driven and receptor elements if capacitor 16 is constructed in accordance with the referenced disclosure) and to a control element (not shown), or an indicating device, such as a dial 22 illustrated. For example, if transmitting capacitor 10 is an angle transducer in an inertial guidance system, then the shaft 21 of motor M may also be connected to drive a steering mechanism such as a rudder, or if it is a pen position sensor in a chart recorder, then shaft 21 may be connected to the chart pen drive mechanism. In any event, whenever the feed through capacitances $C_T$ and $C_R$ of capacitors 10 and 16 are equal, since they are of opposite phase, a null signal of zero signal level will appear at the common input N of amplifier 15, which thus functions as a null junction. However, if the feed-through capacitances of elements 10 and 16 differ, an error signal is provided, for example, as signal $E_O$ which drives motor M until the feed-through capacitances $C_T$ and $C_R$ are equal, or signal $E_I$. If the two capacitors 10 and 16 are identical, it will be obvious that balance of the servomechanism can only occur when the angular positions of capacitors 10 and 16, which are represented respectively in FIG. 1 by angles $A_{in}$ and $A_{out}$, are equal.

Also, as illustrated in FIG. 1, all external conductors between capacitors 10 and 16 and the associated electronics are fully shielded. As noted, since the drive voltages $E_D$ and $-E_D$ are driven from low impedance sources, any stray or cable capacitance or cable leakage will have no effect on the accuracy of the servo. The effective input capacitance of the amplifier 15 is $KC_F$. If 15 is a high gain operational amplifier, with a gain of 5,000 or better, and $C_F$ is a capacitance of from 100 to 1,000 pF, the input capacitance at N will be so high that changes in cable capacitance will have very little effect. Similarly, any resistive leakage to ground in the cables connected to low terminals 12A and 18A will have little effect.

Also, if transmitter capacitor 10 and receiver capacitor 16 in FIG. 1 are identical, any nonlinearity and fringing effects, if present, will cancel. It is, however, best to have receiver element 16 linear with angular position within 10 percent or better, as changes of the rate of change of capacitance with angle at different positions would cause a change in servo loop gain. In FIG. 1, the output position of shaft 21 (angle $A_{out}$) is simply an angular indication of the input angle $A_{in}$ of capacitor 10.

In the above description of FIG. 1, and in the description of embodiments of this invention to be described, the drive signals $E_D$ and $-E_D$ are preferably of equal amplitude, and balance of the servomechanism occurs when feed-through capacitances $C_T$ and $C_R$ are equal. However, by proper scaling of different drive voltage ratios (for example, $E_D$ and a drive voltage $-E'_D$ of different amplitude) balance of the servomechanism can be achieved by considering the products of the feed-through capacitances and the respective drive voltages so that, for example, balance occurs when $C_T \cdot E_D = C_R \cdot (-E'_D)$ (with polarity ignored). Also, while the error signal representing servomechanism imbalance is described throughout this specification as being either $E_I$ or $E_O$, it can be any detectable signal in the system which is a function of the balance between $C_T$ and $C_R$ where $E_D$ and $-E_D$ are of equal amplitude, or the feed-through capacitance and drive voltage products. Those components of the system which respond to the error signal to cause a change in the feed-through capacitance of $C_R$ to balance the system function as a control means. For example, if the error signal in FIG. 1 is $E_I$, then the control means would include demodulator 19, servo amplifier 20, servo motor M and the mechanical coupling between motor M and capacitor $C_R$.

Figure 2:
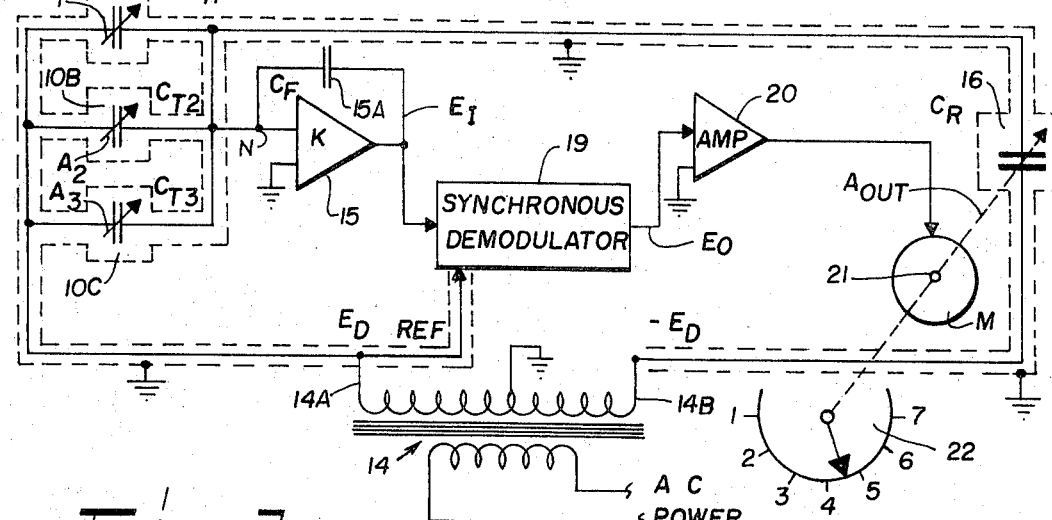
FIG. 2 is a schematic diagram of another form of capacitive servomechanism of this invention employing a plurality of transmitters each of which may be angle transducers.

FIG. 2 is similar to FIG. 1 except that a plurality of three-terminal transmitting capacitors, such as described with respect to capacitor 10 of FIG. 1, are used. In the FIG. 2 embodiment, the transmitting element of the servomechanism includes a capacitor 10A of feed-through capacitance $C_{T1}$ and at an angular position $A_1$, a capacitor 10B of feed-through capacitance $C_{T2}$ and at angular position $A_2$, and a capacitor 10C of feed-through capacitance $C_{T3}$ and at angular position $A_3$. In this instance, accuracy of the servomechanism is dependent on the capacity $C_R$ of receiver capacitor 16 being linear. In FIG. 2, the output angle $A_{out}$ is a function of the input angles $A_1$, $A_2$ and $A_3$. The transmitters 10A, 10B and 10C may all be linear if it is desired to simply add the angles, or one or more may be nonlinear to perform the functions of the simple analog computer.

Figure 3:
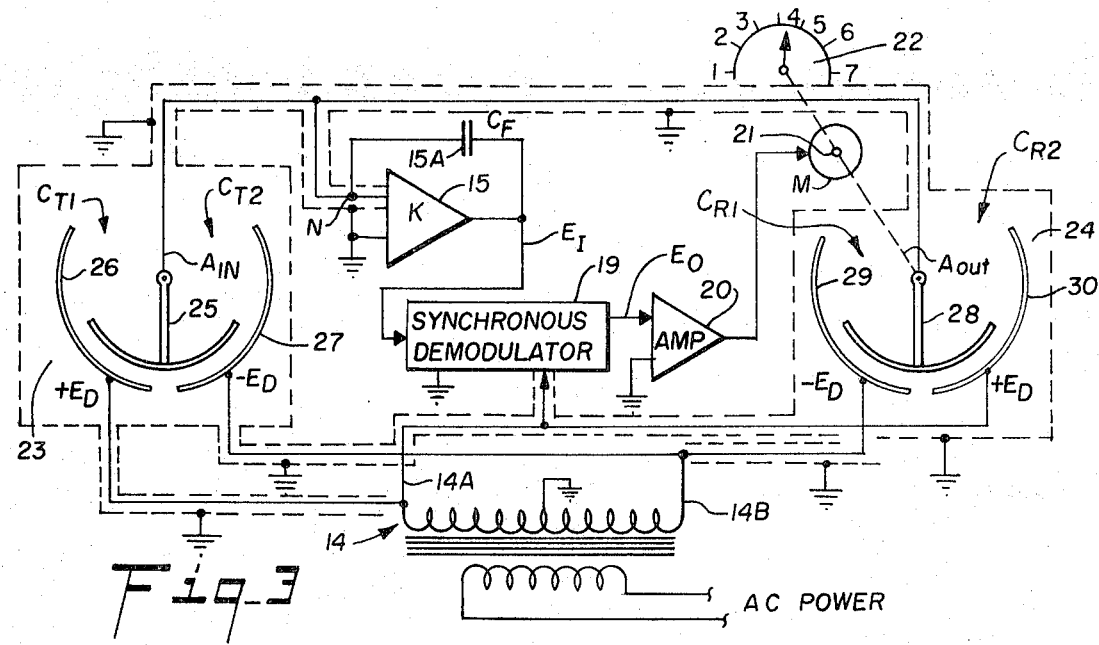
FIG. 3 is a schematic diagram of another embodiment of capacitive servomechanism of this invention which uses differential three-terminal capacitors as both the transmitter and receiver thereof.

FIG. 3 is an angular position servomechanism similar to FIG. 1 except that both the transmitter and the receiver are three-terminal differential variable capacitors 23 and 24 respectively. Capacitor 23 includes a single receptor element 25 and two driven elements 26 and 27, and receptor element 25 is at an angular position $A_{in}$. Capacitor 24 includes a single receptor element 28 and two driven elements 29 and 30. The driven elements 26 and 29 are connected to the secondary of a transformer 14 which provides a source 14A of electrical drive signals $E_D$, and driven elements 27 and 30 are also connected to the secondary of transformer 14 which provides a source 14B of electrical drive signals $-E_D$ of the same amplitude as drive signals $E_D$ but of opposite phase. Receptor elements 25 and 28 are movable elements and are connected to the input N of amplifier 15, clamped at virtual ground, as described with respect to FIG. 1, by amplifier 15, the output circuitry of FIG. 3 being identical to that of FIG. 1. The feed-through capacitance of receptor element 25 and driven element 26 is $C_{T1}$, the feed-through capacitance of receptor element 25 and driven element 27 is $C_{T2}$, the feed-through capacitance of receptor element 28 and driven element 29 is $C_{R1}$, and the feed-through capacitance of receptor element 28 and driven element 30 is $C_{R2}$ so that balance occurs when $C_{T1}-C_{T2} = C_{R1}-C_{R2}$. If transmitting capacitor 23 is identical in construction to receiving capacitor 30, $A_{out}$ will equal to $A_{in}$ when the servomechanism is at balance. The movement of either of receptor elements 25 and 28 will cause an error signal such as $E_O$ which will cause movement of indicator dial 22 or a control mechanism (not shown) connected to shaft 21 until the system is again at balance. This type of servomechanism is well adapted for use with small angle sensors such as are disclosed in the copending Pat. application of Edward V. Hardway, Jr., Ser. No. 134,818, filed Apr. 16, 1971, entitled "Capacitive Pick-Off Transducer."

Figure 4:
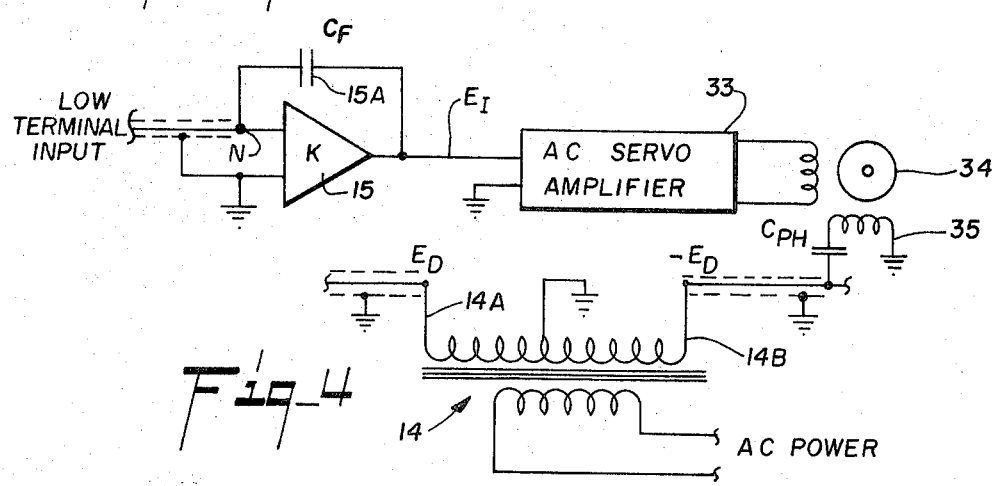
FIG. 4 is a partial schematic diagram of another form of servomechanism of this invention utilizing a different form of servo control apparatus.

In FIG. 4, synchronous demodulator 19, DC servo amplifier 20 and DC motor M shown in FIGS. 1, 2 and 3 are replaced by an AC servo amplifier 33 and a two phase AC motor 34 having a reference winding 35. As shown, the output of amplifier 15 would be connected to the input of amplifier 33. Functionally, this arrangement is quite similar to the arrangement of FIGS. 1, 2 and 3 since two phase AC motor 34 develops torque only when driven by an AC voltage component which is either in phase or 180° out of phase with the drive voltage $E_D$ when its reference winding 35 is shifted 90° with respect to $E_D$ or $-E_D$. The phase of winding 35 is shifted 90° by selecting the proper value of a phase shifting capacitor $C_{PH}$ connected between winding 35 and source 14B. Synchronous demodulator 19 of FIGS. 1, 2 and 3 and two phase AC motor 34 are both unresponsive to quadrature voltages that appear on output signal $E_I$ from amplifier 15, and by use of either the effect of conductance that may appear on signal EI can be effectively cancelled.

Figure 5:
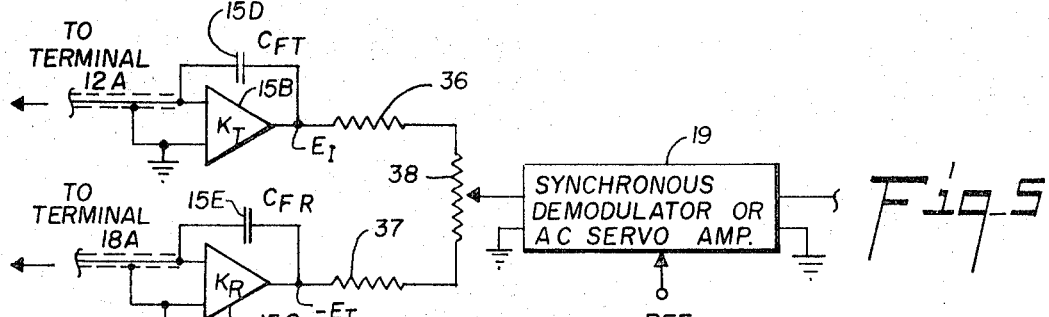
FIG. 5 is a partial schematic diagram of another form of a capacitive servomechanism of this invention utilizing two high gain amplifiers.

FIG. 5 shows a portion of the schematic diagram shown in FIGS. 1 thru 4 wherein the single high gain amplifier 15 is replaced by two high gain amplifiers 15B and 15C, respectively, having feed capacitors 15D (of capacitance $C_{FT}$) and 15E (of capacitance $C_{FR}$). For example, if connected into the servomechanism of FIG. 1, amplifier 15B may have its input connected to receptor element 12 and terminal 12A of transmitter 10, and amplifier 15C may have its input connected to receptor element 18 and terminal 18A of receiver 16. Amplifiers 15B and 15C provide two out of phase outputs $E_I$ and $-E_I$, respectively, which are added through summing resistors 36 and 37 connected to the outputs of amplifiers 15B and 15C, respectively. A potentiometer 38 connected between resistors 36 and 37 is used to balance out any differences between $C_T$ and $C_R$, between $C_{FT}$ and $C_{FR}$ or between $E_D$ and $-E_D$. The function of potentiometer 38 could be provided by trimming capacitors across feedback capacitors 15D and 15E.

Figure 6:
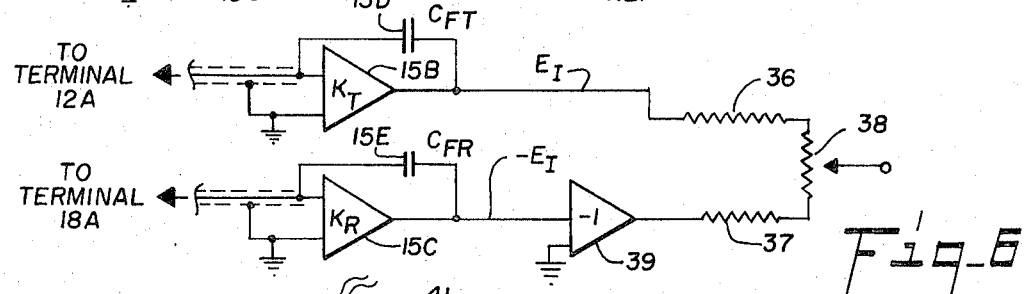
FIG. 6 is a partial schematic diagram of another form of capacitive servomechanism of this invention employing separate high gain amplifiers for the transmitter and receiver.

If it is desirable to use only a single phase drive to drive the driven elements of capacitors 10 and 16 of FIG. 1, so that only one of signals $E_D$ or $-E_D$ is on both elements 11 and 17, the circuit of FIG. 6 can be substituted for the circuit in FIG. 5. For example, a "−1" or inverting amplifier 39 can be connected between the output of amplifier 15C and resistor 37 and used with the AC servo amplifier and two-phase motor arrangement of FIG. 4 and there would be no need for a bipolar drive, such as supplied by source 14. This is, however, a less preferred embodiment because of the added amplifiers and circuitry giving more possible sources for error.

In the embodiments of FIGS. 1-3, the transmitting and receiving capacitors described have been angle or position transducers. However, in many applications of the servomechanism of this invention, such as measuring or detecting moisture content, ingredients ratio, or material level, the transmitting capacitors of FIGS. 1, 2 and 3 may be replaced by a probe or dielectric cell that has its feed-through capacitance affected by the dielectric properties of a material. Examples of such applications of such probes or cells are illustrated in FIGS. 7-12. In these applications, additional shunt conductance may be provided by the presence of a dielectric material close to or about the transmitting capacitor, and the function of synchronous demodulator 19, or the phase sensitive circuit of FIG. 4, is particularly important in cancelling or reducing the effects of such conductance. A more detailed description of the operation of demodulator 19 may be found in the copending Pat. application of Edward V. Hardway, entitled "Three-Terminal Capacitive Apparatus for Remotely Responding to a Condition or Dielectric Properties of a Material," Ser. No. 206,463, filed Dec. 9, 1971.

Figure 7:
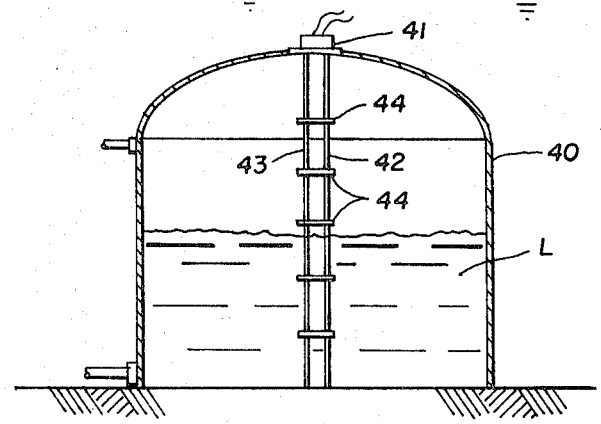
FIG. 7 shows a tank containing liquid with a three-terminal capacitive level probe installed therein which may be utilized as the transmitting capacitor of the FIG. 1 embodiment.

FIG. 7 is a cross-sectional view of a tank 40 containing liquid L and a three-terminal capacitive probe 41 comprised of long conducting tubes or rods 42 and 43 separated by insulating spacers 44. Probe 41 may be substituted for transmitting capacitor 10 of FIG. 1 with rod 42 functioning as a driven element and connected to terminal 11A, and rod 43 functioning as a receptor element and connected to terminal 12A. The capacitive coupling between driven rod 42 and receptor rod 43 will increase as the material L in tank 40 rises, and dial 22 can be scaled to provide an indication of the level of material L. A suitable three-terminal probe for this application is shown in detail in the copending patent application of Edward V. Hardway, referenced on lines 4-6 of this page. The indicator dial 22 will, of course, have to be calibrated differently for different materials having different dielectric constants. In practice, a level servomechanism with probe 41, substituted for capacitor 10 in FIG. 1, is limited in application to materials generally known as nonconducting liquids and solids. However, a very large number of industrial materials fall in that category.

Figure 8A:
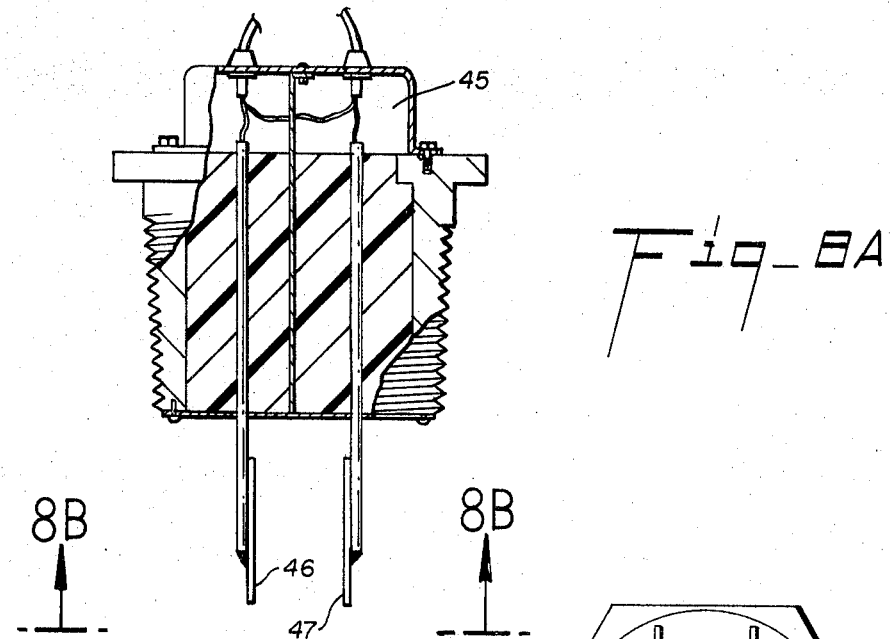
FIG. 8A is a view of a preferred form of dielectric constant probe in elevation with substantial cut away to show the construction thereof, which probe may be threaded into a cell or container and replaces the transmitting capacitor of the FIG. 1 embodiment.
Figure 8B:
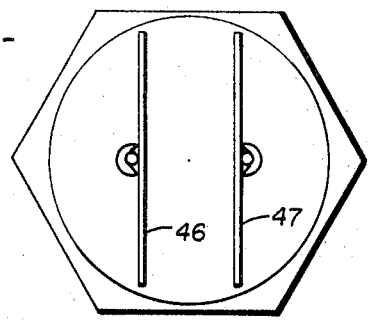
FIG. 8B is an end view of the probe of FIG. 8A.

FIGS. 8A and 8B illustrate a dielectric constant three-terminal probe 45 which may be screwed into a tank, a pipe, or a cell filled with material whose dielectric constant is to be measured and which may replace the transmitting capacitor 10 in FIG. 1. Probe 45 includes parallel, spaced apart capacitive plates 46 and 47, and, for example, plate 46 may function as a driven element 11, and plate 47 may function as receptor element 12. Details of construction of such a probe 45 and its applications are described in the aforementioned copending patent application referenced on lines 4-6 on page 15. In the embodiment of FIG. 1 with probe 45 replacing capacitor 10, the servomechanism becomes responsive to dielectric constant. Depending on the use, the indicator dial 22 may be calibrated in terms of the ratio of ingredients of materials of different dielectric constants or it may be calibrated in percent of moisture. Since water has a dielectric constant of 80, and the dielectric constants of many materials are well under 10, it is obvious that the presence of even small amounts of water will greatly increase their dielectric constant.

Figure 9:
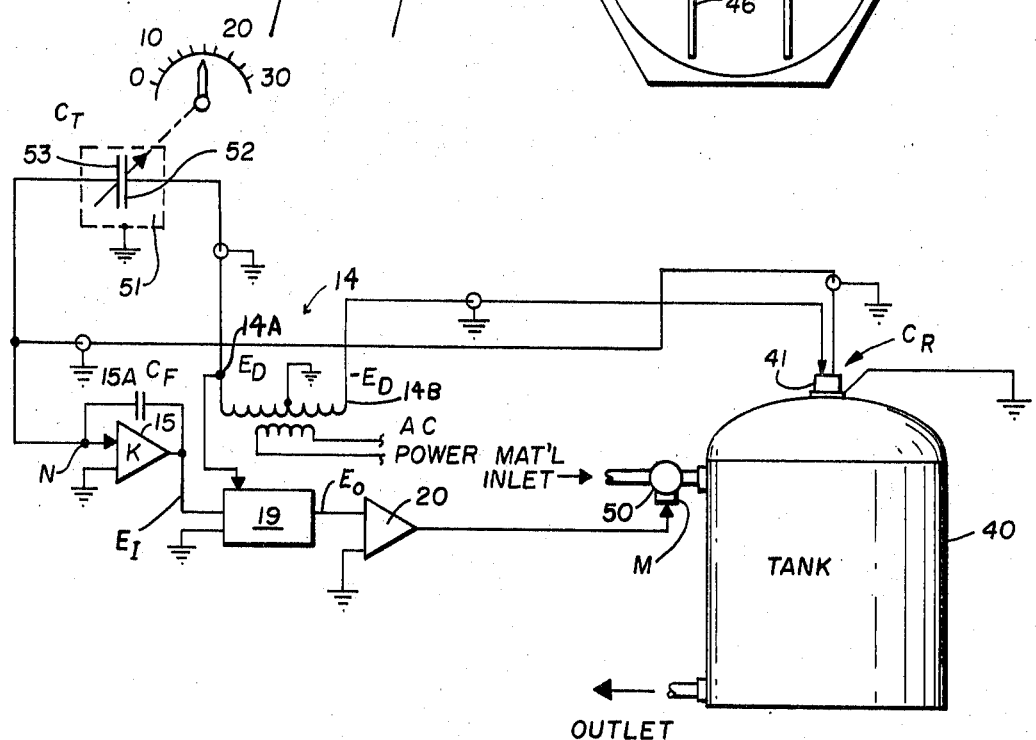
FIG. 9 illustrates a level control system employing a capacitive servomechanism of this invention with a three-terminal capacitive level probe such as shown in FIG. 7.

In FIG. 9, a level control system employing a capacitive servomechanism of this invention is shown. In this embodiment, the application of the servomechanism is to control the level of materials in a tank such as tank 40 shown in FIG. 7 containing a three-terminal capacitive level probe 41 which serves as the receiving capacitor corresponding to capacitor 16 of FIG. 1 and having a feed-through capacitance $C_R$. The drive electronics and output electronics may be that shown in FIGS. 1, 4, 5 or 6 with the FIG. 1 electronics being shown in FIG. 9. Servo motor M is connected to a valve 50 which is connected to source of material L (not shown) and controls the amount of material L flowing into tank 40 in response to an error signal such as signal $E_O$. A level setting three-terminal transmitting capacitor 51 having feed-through capacitance $C_T$ and including a driven conductive element 52, and a receptor conductive element 53, has its receptor element 53 connected in shunt with the receptor element of the probe or receiving capacitor 41. Drive signals $E_D$ are conducted to the driven element of transmitting capacitor 51 and drive signals $-E_D$ are conducted to receiving capacitor 41 driven element. The receptor elements of capacitor 41 and 51 are connected to null junction N and clamped to virtual ground. When the servomechanism of FIG. 9 is in balance, then capacitance $C_R$ will equal capacitance $C_T$.

It will be evident that a lowering of $C_T$ will cause the servo to go into a state of imbalance and cause the valve 50 to open in response to an error signal such as $E_O$ until the equation is again satisfied. Similarly, if capacitance $C_T$, the set level, is increased by the operator, valve 50 would open and allow material to flow into tank 40 until the equation is again satisfied. In some cases, it may be desirable to use the circuit shown in FIG. 5 with the capacitors 41 and 51 shown in FIG. 9, instead of the FIG. 1 circuitry, since the capacitance or probe 41 may be many times greater than the capacitance of level setting capacitor 51. Varying capacitance ratios may be accommodated by making resistor 36 in FIG. 5 different from resistor 37 or by making $C_{FT}$ larger or smaller than $C_{FR}$. Alternately, the drive voltage $-E_D$ connected to probe 41 may be reduced and made smaller in magnitude than by using different taps on the transformer secondary. In the latter instance, balance will occur when the voltage-capacitance product of one phase equals the voltage-capacitance product of the other phase.

Figure 10:
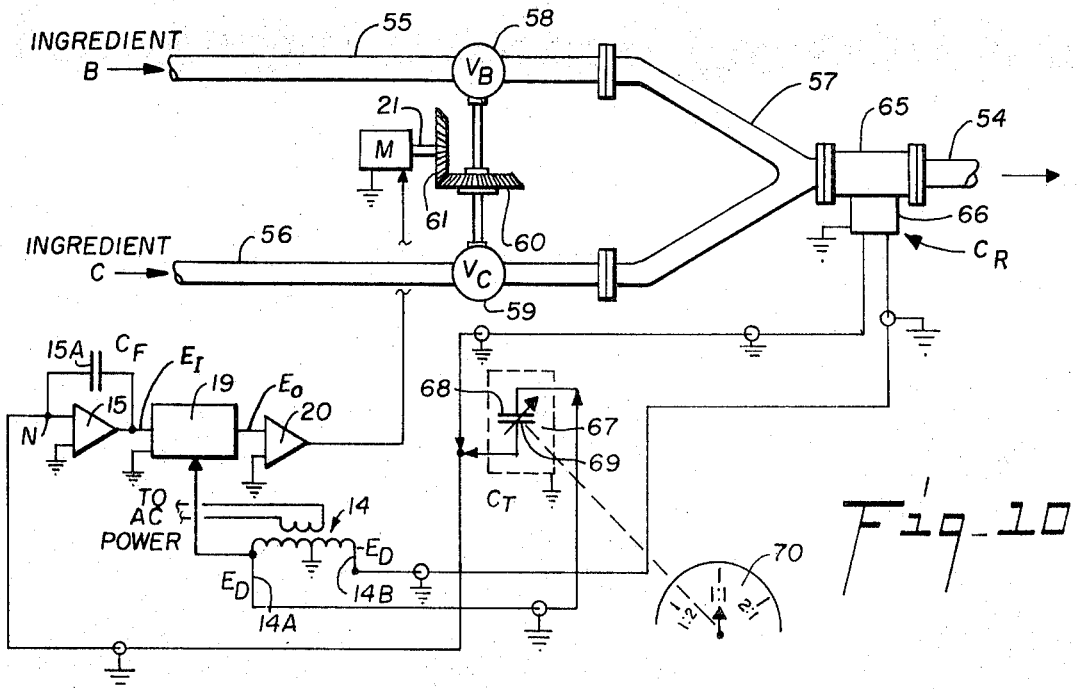
FIG. 10 shows a capacitive servomechanism of this invention used to control the mixture ratio of two ingredients.

Referring now to FIG. 10, the servomechanism of this invention is illustrated as controlling the mixture ratio of two ingredients B and C flowing in a pipeline 54. In this illustration, the electronic drive circuits and output electronics may be those as illustrated in FIGS. 1, 4, 5 or 6, with the FIG. 1 electronics being shown. The materials input to pipeline 54 are supplied by a pipeline 55 connected to a source (not shown) of material B and a pipeline 56 connected to a source (not shown) of material C. As illustrated, pipelines 55 and 56 are joined together by a Y coupling 57 which is connected into pipeline 54 to feed materials B and C into pipeline 54. A valve 58 is connected in series with pipeline 55 and valve 59 is connected in series with pipeline 56. Valves 58 and 59 may be 90° butterfly valves with the valve stems connected to each other, and to a gear 60 which, when rotated, rotates the valve stems of valves 58 and 59 so that when one of the valves is fully open, the other is fully closed. Drivingly connected to gear 60 is a gear 61 on the shaft 21 of servo motor M which when driven by servo amplifier 20, drives valves 58 and 59 between their open and closed positions.

A pipe coupling 65 which includes a three-terminal receiving capacitor or probe 66, with a feed-through capacitance $C_T$ is connected in series with pipeline 54 so that the capacitance $C_R$ is a function of the dielectric properties of the material (B+C) flowing in pipeline 54. Probe 45 shown in FIGS. 8A and 8B is an example of the type of probe that may be mounted in coupling 65 to provide probe 66. The driven element of probe 66 is connected to be driven by drive signal $-E_D$ and the receptor is connected to null junction N and thus clamped to virtual ground. A three-terminal variable capacitor 67 having a driven element 68 and a receptor element 69 and feed-through capacitance $C_T$ is also provided as a transmitting capacitor for setting a desired mixture ratio for ingredients B and C. Driven element 68 is connected to be driven by drive signals $E_D$ and receptor element 69 is connected to null junction N, and clamped at virtual ground. Capacitor 67 along with capacitor 66 forms a differential capacitor so that their combined feed-through capacitance can be considered as provided by $C_T - C_R$ and will be zero when $C_T = C_R$. Thus, the signal level at null junction N will be zero when $C_T = C_R$ and an error signal will be present when this balance condition is not present. Thus, if $C_R$ increases or decreases with respect to $C_T$, indicating a change in dielectric constant (ingredients ratio) in the material adjacent probe 66, an error signal, such as signal $E_O$, will drive motor M and valves 58 and 59 until $C_R$ again equals $C_T$. Also, if the operator desires a different ingredients ratio, he can vary capacitor 67 (capacitance $C_T$) until it is set to provide a desired ratio. The control element of capacitor 67 may be scaled to directly read out the various ingredients ratios to be set on a dial 70 and the openings in valves 58 and 59 set so that the ratio of materials C and B flowing through them tracks the setting of capacitor 67. For example, if B and C are to be at a ratio of 1:1 and valves 58 and 59 are each set midway (assuming the same flow rate for materials B and C), then capacitor 67 should be set so that capacitance $C_T$ equals the desired capacitance $C_R$ which is dependent on the dielectric constant of two ingredients being mixed. A separate dial calibration is required for any two materials. Then, if the desired ingredients ratio is changed on dial 70 to 2:1 (B to C), this will cause an imbalance between $C_T$ and $C_R$ and thus an imbalance between the capacitances of capacitors 66 and 67 so that the error signal $E_O$ will be provided. This error signal will cause motor M to drive valves 58 and 59 until the error signal becomes zero as the dielectric constant of the mixture reaches the desired value. Of course, the relative position of the valves 58 and 59 for a given ingredients ratio will depend on a number of factors, such as the respective pressures in pipes 55 and 56 and the viscosity or flow resistance of the materials B and C, so that the valve positions may not be a linear function of the desired ratios. Of course, as well known in the art, in order to avoid or lessen cycling or overshooting problems, suitable damping should be provided in the servo amplifier employed.

Figure 11:
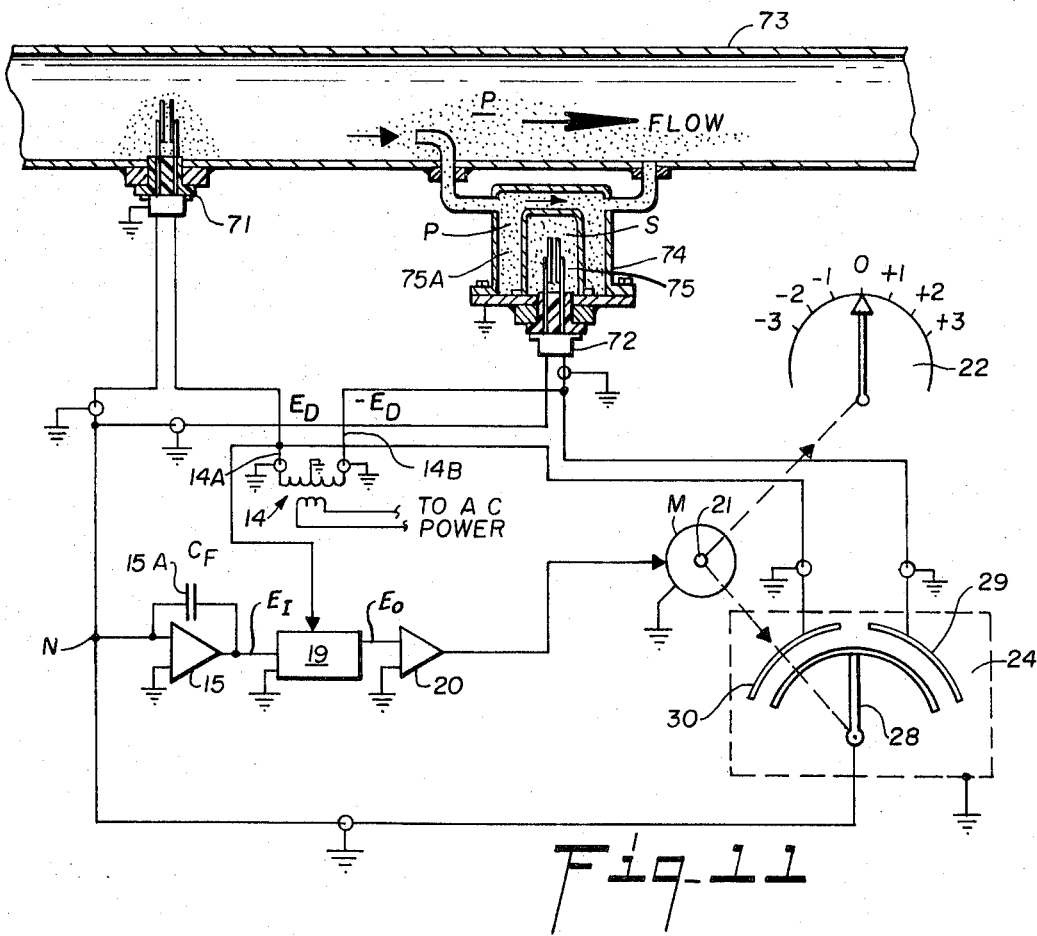
FIG. 11 shows a capacitive servomechanism of this invention for indicating the difference in dielectric constant between a known reference sample or desired mixture and a flowing product which may differ from the desired sample.

Referring now to FIG. 11, the servomechanism of this invention is illustrated as being utilized to indicate the difference in dielectric constant of products flowing in a pipeline, or the arrival of a pipeline interface. Again, the specific capacitive devices illustrated may be substituted in the circuits of FIGS. 1, 4, 5 and 6, for the capacitors therein, and the electronic drive and output circuitry illustrated in FIG. 11 is that of FIG. 1, but including differential capacitive devices such as disclosed in FIG. 3. The receiving capacitor is capacitor 24 of FIG. 3. However, the differential transmitting capacitor 23 of FIG. 3 is replaced by a three-terminal differential transmitting capacitor formed by a three-terminal capacitive probe 71 mounted in a pipeline 73 in which a product or products P is flowing, and a three-terminal capacitive probe 72 mounted in a standard or reference cell 74 which is in turn mounted on pipeline 73. Probe 72 is mounted in a cavity 75 of cell 74 and a standard product S of known or desired dielectric constant fills cavity 75. Cell 74 also includes a second cavity 75A in communication with the inside of pipeline 73 and surrounding cavity 75, and 75A is filled with product P that bypasses through it. In this manner, probes 71 and 72 will be maintained at substantially a temperature equilibrium so that only differences in the dielectric constant of products P and S will affect the balance of the servomechanism. Probes 71 and 72 may be constructed as probe 45 in FIGS. 8A and 8B, and each includes a conductive driven element, one of which is connected respectively to source 14A of drive signals $E_D$, and the other to source 14B of drive signals $-E_D$, and their receptor elements are connected to input N of amplifier 15, and clamped to virtual ground. The feed-through capacitance of probe 71, which is affected by the dielectric constant of product P, may be termed $C_T(test)$, the feed-through capacitance of probe 72, which is affected by the dielectric constant of product S, termed $C_R(ref)$, and the feed-through capacitances of receiver capacitance 24 termed $C_{R1}$ and $C_{R2}$ as in FIG. 3. Thus, when $C_T(test) - C_T(ref) = C_{R1} - C_{R2}$, the system will be at balance and no error signal will be present. If the geometries of probes 71 and 72 and the capacitive elements forming capacitor 24 are equal, then $C_T(test)$ will equal $C_T(ref)$ when the dielectric constants of P and S are equal and the system will be at balance with $C_{R1} = C_{R2}$. This condition may be represented by a zero indication on indicator dial 22 as shown. This condition will generally mean that products P and S are the same. If a product interface arrives at probe 71 with a dielectric constant that is different than that of product S, then $C_T(test)$ will not be equal to $C_T(ref)$ and an error signal such as signal $E_O$ will be present to drive servo motor M, capacitor 24 and indicator dial 22 until $C_{R1} - C_{R2}$ again equals $C_T(test) - C_T(ref)$. The new reading on dial 22 will then indicate the arrival of the interface and can also be scaled to represent the new product. Also, initially standard product S can be different from product P and be a product (or interface) expected to appear at probe 71. In this case, the system will be out of balance until the expected product appears and its appearance will be indicated by dial 22 going to zero, assuming that the new product and reference product S have the same dielectric constant. Of course, dial 22 can be scaled to represent moisture content of various products or mixtures of products, and the zero point can be set either when $C_{R1} = C_{R2}$, as shown, or when $C_{R1}$ and $C_{R2}$ are not equal and zero is to be represented by some fixed relationship between products P and S.

In FIG. 12, a servomechanism such as shown in FIG. 10 is illustrated, except that coupling 65, probe 66 and capacitor 67 are replaced by a differential dielectric cell 76 which includes a standard or reference section 77 which has a three-terminal probe 78 mounted in it, and is filled with a material S of known or desired dielectric constant to serve as transmitting capacitor. Cell 76 also includes a test section 79 which has a three-terminal probe 80 mounted in it and which is connected between coupling 57 and pipeline 54 so that section 79 is filled with test material T which is the flow product (ingredient B and ingredient C) flowing in pipeline 54. Probe 80 serves as the receiving capacitor of the servomechanism. Sections 77 and 79 are arranged adjacent to each other so that a temperature equilibrium is established between the materials in them. One of the driven elements of probes 78 and 80 are connected to source 14A of drive signals $E_D$, the other driven element to source 14B of drive signals $-E_D$, and the receptor elements of probes 78 and 80 are connected to input N of amplifier 15 and clamped to virtual ground. Probes 78 and 80 thus have feed-through capacitances $C_T(ref)$ and $C_T(test)$ respectively which are a function of only the dielectric constant of the materials S and T, and the geometry and spacing of their capacitive elements. The system of FIG. 12 is at balance when $C_T(test) = C_T(ref)$ such as described with respect to FIG. 11. If $C_T(test)$ becomes larger or smaller than $C_T(ref)$, then the system becomes imbalanced and motor M moves valves 58 and 59, adding more or less of the materials B and C, and the receptor element of capacitor 64 until the system again balances.

Reference is made to the copending Pat. application of Edward V. Hardway, Jr., entitled "Differential Methods and Apparatus for Measuring Dielectric Constant to Determine a Condition of a Material," Ser. No. 187,793, Filed Oct. 8, 1971 (attorney's docket Spearhead-13), for a more complete description of such differential capacitive cells and probes for a variety of applications, which can be employed with the capacitive servomechanisms of this invention.

Again, it is not always desirable to leave the opposing reference voltages $E_D$ and $-E_D$ equal. Balance is achieved when the voltage-capacitance products of the two opposite phases are equal.

Also, in all the embodiments described where the condition of a material (i.e., level, ingredient ratio, or moisture content) is being monitored or controlled, it may be desirable to form the feedback capacitor 15A of amplifier 15 of parallel plates or concentric cylinders and immerse them in the material to reduce the effect of changing dielectric constant with temperature, i.e., to make the ratio of the feed-through capacitance $C_T$ to the feedback capacitance $C_F$ insensitive to temperature.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A servomechanism comprising in combination: a three-terminal transmitting capacitor including a transmitter driven element, a transmitter receptor element, and a transmitter ground terminal; a three-terminal receiving capacitor including a receiver driven element, a receiver receptor element and a receiver ground terminal; first circuit means for applying drive signals of predetermined AC voltage level to each of said driven elements; second circuit means, including at least one high gain amplifier with a capacitive feedback loop, to maintain both of said receptor elements at virtual ground and produce an error signal responsive to the difference in feed-through capacitance, AC voltage level product of said transmitting and receiving capacitors; third circuit means coupled to said ground terminals for shielding said first circuit means for said second circuit means; and control means responsive to said error signal and operably connected to cause a change in the feed-through capacitance of said receiving capacitor in a direction to minimize said error signal.

2. The servomechanism of claim 1 wherein the second circuit means includes a synchronous demodulator synchronized with said AC drive signals to provide an output signal substantially unaffected by shunt conductance present between the elements of said capacitors.

3. The servomechanism of claim 1 wherein said control means includes an AC servo amplifier responsive to said error signal and a two phase AC motor having a control winding and a reference winding and wherein the current in said reference winding is 90° out of phase with the current in said control winding caused by the presence of said error signal.

4. The servomechanism of claim 1 wherein the said drive signals include a first drive signal of one phase and a second drive signal of opposite phase and wherein said first circuit means conducts one of said drive signals to said transmitter driven element and the other of said drive signals to said receiver driven element.

5. The servomechanism of claim 1 wherein electrical drive signals of the same amplitude and phase are conducted to each of said transmitter and receiver driven elements, and wherein said second circuit means includes a first high gain amplifier having a capacitive feedback loop and connected at an input to said transmitter receptor element, a second high gain amplifier having a capacitive feedback loop and connected at an input to said receiver receptor element, an inverting amplifier connected at an input to the output of one of said first and second high gain amplifiers, and combining means connected between the output of said inverting amplifier and said other of said first and second high gain amplifiers to combine the output signals therefrom and provide said error signal.

6. The servomechanism of claim 4 wherein said second circuit means includes a first high gain amplifier having a capacitive feedback loop and connected at an input to one of said transmitter and receiver receptor elements, a second high gain amplifier having a capacitance feedback loop and connected at an input to the other of said transmitter and receiver receptor elements, and means connected to the outputs of said first and second amplifiers to combine the output signals therefrom and provide said error signal.

7. The servomechanism of claim 1 wherein each of said transmitting and receiving capacitors are positional transducers, so that the position of said transmitting capacitor represents a servomechanism input, and the position of said receiving capacitor represents a servomechanism output.

8. The servomechanism of claim 7 wherein a plurality of positional transducers connected in parallel with each other provide the capacitance for said transmitting capacitor.

9. The servomechanism of claim 7 further including indicating means connected to said control means to provide an indication of the angular position of said receiving capacitor.

10. The servomechanism of claim 1 wherein each of said transmitting and receiving capacitors are variable differential capacitors.

11. The servomechanism of claim 10 wherein each of said transmitting and receiving differential capacitors are positional transducers so that the position of said transmitting differential capacitor represents a servomechanism input, and the position of said receiver differential capacitor represents a servomechanism output.

12. The servomechanism of claim 1 wherein said transmitting capacitor is a level probe with its feed-through capacitance responsive to level of a material, and further including indicating means connected to said control means to provide an indication of said level.

13. The servomechanism of claim 12 wherein said second circuit means includes a synchronous demodulator for substantially cancelling the effect of conductance from said error signal.

14. The servomechanism of claim 1 wherein said servomechanism provides control of material level in a tank and said receiving capacitor includes a level probe mounted in a tank so that its feed-through capacitance is responsive to the level of material in the tank, and wherein the transmitting capacitor is a level setting capacitor with its receptor element connected in parallel with said receiver receptor element, and wherein said control means includes a valve connected between said tank and a source of material and responsive to said error signal to add material to said tank.

15. The servomechanism of claim 14 wherein said second circuit means includes a synchronous demodulator for substantially cancelling the effect of conductance from said error signal.

16. The servomechanism of claim 1 wherein said transmitting capacitor is a dielectric constant probe and further including means connected to said control means to provide an indication of the dielectric properties of a material that may be in proximity to said probe.

17. The servomechanism of claim 16 wherein said second circuit means includes a synchronous demodulator for substantially cancelling the effect of conductance from said error signal.

18. The servomechanism of claim 1 wherein said servomechanism provides control of the ingredients ratio of two materials in a container; wherein said receiving capacitor includes a dielectric probe mounted in said container so that the feed-through capacitance of said probe is responsive to the dielectric properties of said materials, and ratio setting transmitting capacitor; and wherein said control means includes a valve controlling the flow of at least one of said materials into said container.

19. The servomechanism of claim 18 wherein said second circuit means includes a synchronous demodulator for substantially cancelling the effect of conductance from said electrical output signal.

20. The servomechanism of claim 1 wherein said transmitting capacitor is a differential capacitor comprising two three-terminal capacitor probes, one of said probes adapted to be mounted in a container to be responsive to the dielectric properties of a material of unknown dielectric properties, and the other of said probes adapted to be mounted in a reference cell including a material of known dielectric properties, and further including means for establishing a temperature equilibrium between the materials of unknown and known dielectric properties.

21. The servomechanism of claim 20 wherein said second circuit means includes means for substantially cancelling the effect of conductance from said electrical output signal.

22. The servomechanism of claim 1 wherein said servomechanism is responsive to the dielectric properties of a material flowing in a pipeline; said servomechanism further including a reference dielectric cell adapted to be mounted on such a pipeline, said cell including a first chamber therein for storage of a quantity of material of known dielectric properties, a second chamber at least partially surrounding said first chamber, means for connecting said second chamber into said pipeline so that the material in the pipeline can pass into said second chamber, and from said second chamber back into said pipeline, whereby a temperature equilibrium can be established between the material flowing in the pipeline and said material of known dielectric properties, and a first three-terminal dielectric probe mounted in said first chamber; a second three-terminal dielectric probe adapted to be mounted in said pipeline and spaced from the position where said second cell is connected into said pipeline, said first and second probes comprising a differential transmitting capacitor for said servomechanism; and wherein said receiving capacitor is a differential capacitor; and further including indicating means connected to said control means and responsive thereto to indicate a relationship between dielectric properties of said material in said pipeline and said material of known dielectric properties.

23. The servomechanism of claim 22 wherein said second circuit means includes means for substantially cancelling the effect of conductance from said electrical output signal.

24. The servomechanism of claim 1 wherein said servomechanism provides control of the ingredients ratio of two or more materials in a container; and further including a test chamber with a receiving three-terminal capacitor probe mounted therein so that the feed-through capacitance of said receiving probe is responsive to the dielectric properties of said materials when in said chamber, and a reference chamber with a transmitting three-terminal capacitor probe mounted therein so that the feed-through capacitance of said transmitting probe is responsive to the dielectric properties of a reference material of known dielectric properties when in said reference chamber; and wherein said control means further includes valve means connected between a source of at least one of said materials and said container, said valve means responsive to said error signal to permit addition of a quantity of at least one of said materials to said container.

25. The servomechanism of claim 24 wherein said second circuit means includes means for substantially cancelling the effect of conductance from said electrical output signal.

* * * * *